(12) United States Patent
Shin et al.

(10) Patent No.: US 12,587,567 B2
(45) Date of Patent: Mar. 24, 2026

(54) ELECTRONIC APPARATUS FOR IMPLEMENTING HONEYPOT CONTROL SYSTEM AND CONTROL METHOD THEREOF

(71) Applicants: KOREA ADVANCED INSTITUTE OF SCIENCE AND TECHNOLOGY, Daejeon (KR); S2W INC., Seongnam-si (KR)

(72) Inventors: Seung Won Shin, Daejeon (KR); Dong Min Choi, Daejeon (KR); Hyun Min Seo, Daejeon (KR); Sang Duk Suh, Seongnam-si (KR); Jae Ki Kim, Changwon-si (KR)

(73) Assignees: KOREA ADVANCED INSTITUTE OF SCIENCE AND TECHNOLOGY, Daejeon (KR); S2W INC., Seongnam-si (KR)

( * ) Notice: Subject to any disclaimer, the term of this patent is extended or adjusted under 35 U.S.C. 154(b) by 232 days.

(21) Appl. No.: 18/517,803

(22) Filed: Nov. 22, 2023

(65) Prior Publication Data

US 2024/0283823 A1     Aug. 22, 2024

(30) Foreign Application Priority Data

Nov. 29, 2022     (KR) ........................ 10-2022-0162484

(51) Int. Cl.
     *H04L 29/06*          (2006.01)
     *H04L 9/40*           (2022.01)
(52) U.S. Cl.
     CPC .............................. *H04L 63/1491* (2013.01)
(58) Field of Classification Search
     CPC .. H04L 63/1425; H04L 63/1491; H04L 41/50
     See application file for complete search history.

(56) References Cited

U.S. PATENT DOCUMENTS

| 10,178,119 B1 * | 1/2019 | Brandwine | ............. H04L 67/02 |
| 2018/0124073 A1 * | 5/2018 | Scherman | ........... H04L 63/1491 |

FOREIGN PATENT DOCUMENTS

| KR | 10-2017-0055053 A | 5/2017 |
| KR | 10-2019-0029486 A | 3/2019 |

OTHER PUBLICATIONS

Woo-sik Jung, et al., "Design of Log Analysis System for Enterprise IDS/Firewall/Router", DBPia, Mar. 31, 2003 (7 pages).

(Continued)

*Primary Examiner* — Jeffrey C Pwu
*Assistant Examiner* — Thong P Truong
(74) *Attorney, Agent, or Firm* — USX IP LLC

(57) ABSTRACT

Disclosed is an electronic apparatus for implementing a honeypot control system. The electronic apparatus includes a communication interface, a memory configured to store execution information including information on a virtual machine built on a cloud server, information on a running service, and information on an open port, and a processor configured to functionally control the communication interface and the memory, wherein the processor is configured to transmit execution information obtained based on information stored in the memory to each of a plurality of cloud servers in different Internet Protocol (IP) bands through the communication interface, when log information is received from each of the plurality of cloud servers that have received the execution information through the communication interface, normalize the received log information, and obtain malicious code information using the normalized log information.

8 Claims, 6 Drawing Sheets

(56)  References Cited

OTHER PUBLICATIONS

Korean Office Action dated May 29, 2024 in Application No.
10-2022-0162484.

* cited by examiner services > ssh >
category=ssh, date=2022-
10-03 20:35:15.752504158
+0000 UTC
m=+632825.314460494,
destination-ip=172.17.0.2,
destination-port=8022,
sensor=services, source-
ip=43.156.249.253, source-
port=35002

{"action": "GET",
"dest_ip": "0.0.0.0",
"dest_port": "80",
"server": "http_server",
"src_ip": "23.94.236.146",
"src_port": "51992",
"timestamp": "2022-10-
14T07:32:14.076793"}

{"service":
"HTTP", action": "GET",
"dest_port": "80",
"src_ip": "23.94.236.146",
"timestamp": "2022-10-
14T07:32:14.076793"}

Figure 7:
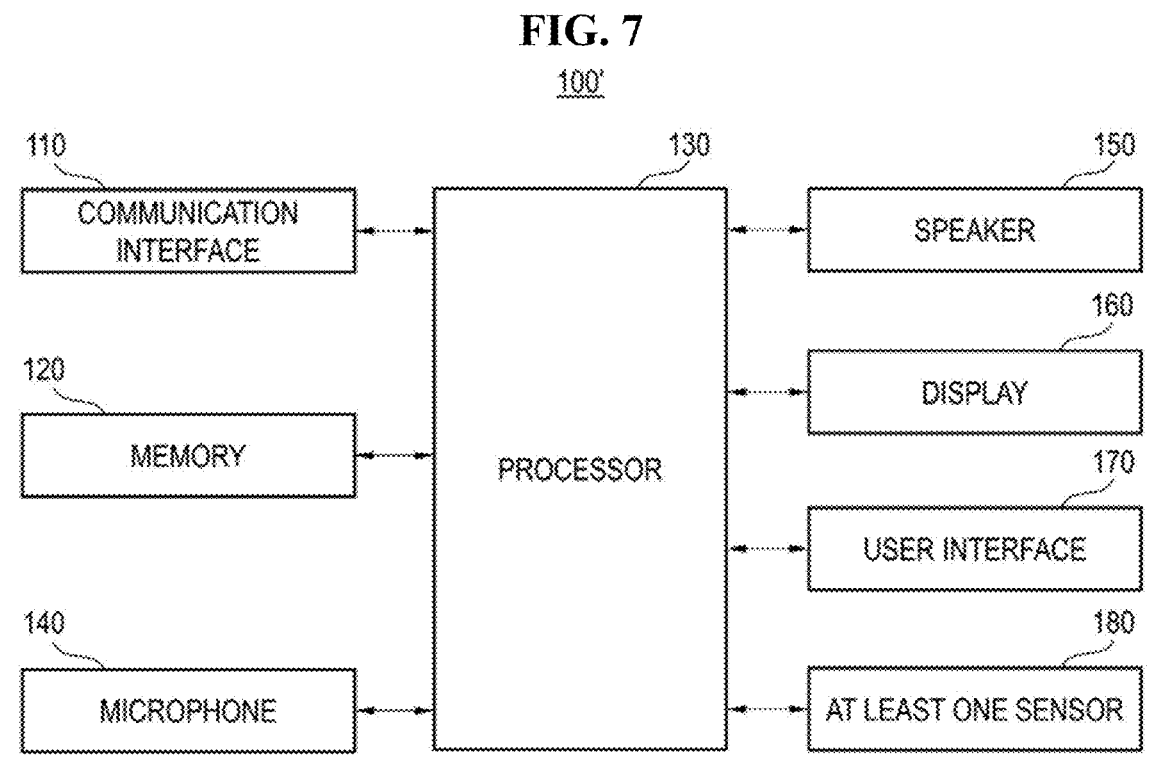

| 110 | |
|---|---|
| COMMUNICATION INTERFACE | |

130 PROCESSOR

150 SPEAKER

120 MEMORY

160 DISPLAY

170 USER INTERFACE

140 MICROPHONE

180 AT LEAST ONE SENSOR

ELECTRONIC APPARATUS FOR IMPLEMENTING HONEYPOT CONTROL SYSTEM AND CONTROL METHOD THEREOF

CROSS-REFERENCE TO RELATED APPLICATION

This application claims priority to and the benefit of Korean Patent Application No. 2022-0162484, filed on Nov. 29, 2022, the disclosure of which is incorporated herein by reference in its entirety.

BACKGROUND

1. Field of the Invention

The present disclosure relates to an electronic apparatus for implementing a honeypot control system and a control method thereof. More specifically, the present disclosure relates to a method of obtaining malicious code information on the basis of log information collected through a plurality of cloud servers on each of which a honeypot system is implemented.

2. Discussion of Related Art

As various types of electronic devices are developed and distributed with the help of development of electronic technology, users are exposed to various malicious programs, including ransomware. In order to solve security problems caused by such malicious programs, it is important to collect malicious code data, and various technologies are being developed to collect such malicious code.

As one method of collecting malicious code, a honeypot system is used. A honeypot system is a virtual system or virtual network intentionally installed to detect abnormal access. A honeypot system may include a honeypot controller and a honeypot agent. Such a honeypot system deploys various services to deceive attackers, and when a deceived attacker attempts an attack, the honeypot system collects attack data or attack execution methods. Accordingly, various attack methods may be collected and effective defense methods may be designed.

SUMMARY OF THE INVENTION

The present disclosure is directed to a method in which malicious code can be collected using a plurality of cloud servers on each of which a honeypot system is implemented, log information in various Internet Protocol (IP) bands can be obtained by setting different regions in each of the plurality of cloud servers, and various pieces of malicious code can be collected based on the obtained log information.

The present disclosure is also directed to a method of collecting various types of log information by building different types of honeypot systems corresponding to each of a plurality of cloud servers.

Problems to be solved by the present disclosure are not limited to the above-described problems and other problems that are not described may be clearly understood by those skilled in the art from this specification and the accompanying drawings.

According to an aspect of the present disclosure, there is provided an electronic apparatus for implementing a honeypot control system, which includes a communication interface, a memory configured to store execution information including information on a virtual machine built on a cloud server, information on a running service, and information on an open port, and a processor configured to functionally control the communication interface and the memory, wherein the processor is configured to transmit execution information obtained based on information stored in the memory to each of a plurality of cloud servers in different IP bands through the communication interface, when log information is received from each of the plurality of cloud servers that have received the execution information through the communication interface, normalize the received log information, and obtain malicious code information using the normalized log information.

Each of the plurality of cloud servers may be implemented as at least one type of honeypot platform, and when the log information is received from each of the plurality of cloud servers implemented as the at least one type of honeypot platform, the one or more processors may parse and normalize the received log information by item.

The one or more processors may be configured to, when log information of different log types is received from each of the plurality of cloud servers implemented as different types of honeypot platforms, parse and normalize the received log information of different log types by item, and index the normalized log information and store the indexed log information in the memory.

The one or more processors may be configured to identify statistical data by item on the basis of the log information stored in the memory, and provide a user interface (UI) including the identified statistical data.

In the plurality of cloud servers, a plurality of servers may be communicatively connected to each other to be implemented as a single cluster and different regions may be assigned to each of the plurality of servers.

According to another aspect of the present disclosure, there is provided a honeypot system including a plurality of cloud servers and an electronic apparatus, which includes an electronic apparatus configured to transmit execution information including information on a virtual machine built on a cloud server, information on a running service, and information on an open port to each of the plurality of cloud servers, when log information is received from each of the plurality of cloud servers that have received the execution information, normalize the received log information, and obtain malicious code information using the normalized log information, and a plurality of cloud servers configured to build one or more virtual machines on the basis of the execution information received from the electronic apparatus, open a port, execute at least one service corresponding to each of the one or more built virtual machines, and transmit the log information obtained through the running service to the electronic apparatus, wherein the plurality of cloud servers are implemented as cloud servers in different IP bands.

According to still another aspect of the present disclosure, there is provided a control method of an electronic apparatus for implementing a honeypot control system, which includes transmitting execution information including information on a virtual machine built on a cloud server, information on a running service, and information on an open port to each of a plurality of cloud servers in different IP bands, when log information is received from each of the plurality of cloud servers that have received the execution information, normalizing the received log information, and obtaining malicious code information using the normalized log information.

Each of the plurality of cloud servers may be implemented as at least one type of honeypot platform, and the normalizing of the received log information may include, when the log information is received from each of the plurality of cloud servers implemented as the at least one type of honeypot platform, parsing and normalizing the received log information by item.

The normalizing of the received log information may include, when log information of different log types is received from each of the plurality of cloud servers implemented as different types of honeypot platforms, parsing and normalizing the received log information of different log types by item, and the control method may further include indexing the normalized log information and storing the indexed log information in a memory.

The control method may further include identifying statistical data by item on the basis of the log information stored in the memory and providing a UI including the identified statistical data.

According to yet another aspect of the present disclosure, there is provided a non-transitory computer-readable recording medium for storing a computer program executed by a processor of an electronic apparatus for implementing a honeypot control system, wherein the computer program includes transmitting execution information including information on a virtual machine built on a cloud server, information on a running service, and information on an open port to each of a plurality of cloud servers in different IP bands, when log information is received from each of the plurality of cloud servers that have received the execution information, normalizing the received log information, and obtaining malicious code information using the normalized log information.

BRIEF DESCRIPTION OF THE DRAWINGS

FIG. 7 is a block diagram illustrating a detailed configuration of an electronic apparatus according to an embodiment.

DETAILED DESCRIPTION OF EXEMPLARY EMBODIMENTS

Hereinafter, the present disclosure will be described in detail with reference to the accompanying drawings.

Terms used herein will be briefly described and the present disclosure will be described in detail.

Although the terms used herein are selected from among general terms that are currently widely used in consideration of functions in embodiments of the present disclosure, these may be changed according to intentions of those skilled in the art, precedents, or the advent of new technology. In addition, in a specific case, some terms may be arbitrarily selected by applicants. In this case, meanings thereof will be described in detail in a corresponding description of embodiments of the present disclosure. Therefore, the terms used herein should be defined based on meanings of the terms and content of this entire specification, rather than simply the terms themselves.

In this specification, an expression such as "have," "may have," "includes," or "may include" refers to the presence of a corresponding feature (e.g., a numerical value, function, operation, or component such as a part) and does not exclude the presence of additional features.

An expression such as "at least one of A or/and B" should be understood as referring to either "A" or "B" or "A and B."

An expression such as "first," "second," or the like as used herein may modify various components, regardless of order and/or importance thereof and is only used to distinguish one component from another component and does not limit the components.

When a component (e.g., a first component) is referred to as being "(operatively or communicatively) coupled with/to" or "connected to" another component (e.g., a second component), it should be understood that the certain component may be directly connected to the other component or the certain component may be connected to the other component through still another component (e.g., a third component).

As used herein, the singular forms "a" and "an" are intended to include the plural forms as well, unless the context clearly indicates otherwise. It will be further understood that the terms "comprise," or "configured to," when used herein, specify the presence of stated features, integers, steps, operations, elements, and/or components but do not preclude the presence or addition of one or more other features, integers, steps, operations, elements, components, and/or groups thereof.

In the present disclosure, a "module" or "unit" performs at least one function or operation and may be implemented as hardware or software or a combination thereof. Further, a plurality of "modules" or a plurality of "units" are integrated into at least one module, excluding "modules" or "units" that need to be implemented with specific hardware, and are implemented by at least one processor (not illustrated).

Figure 1:
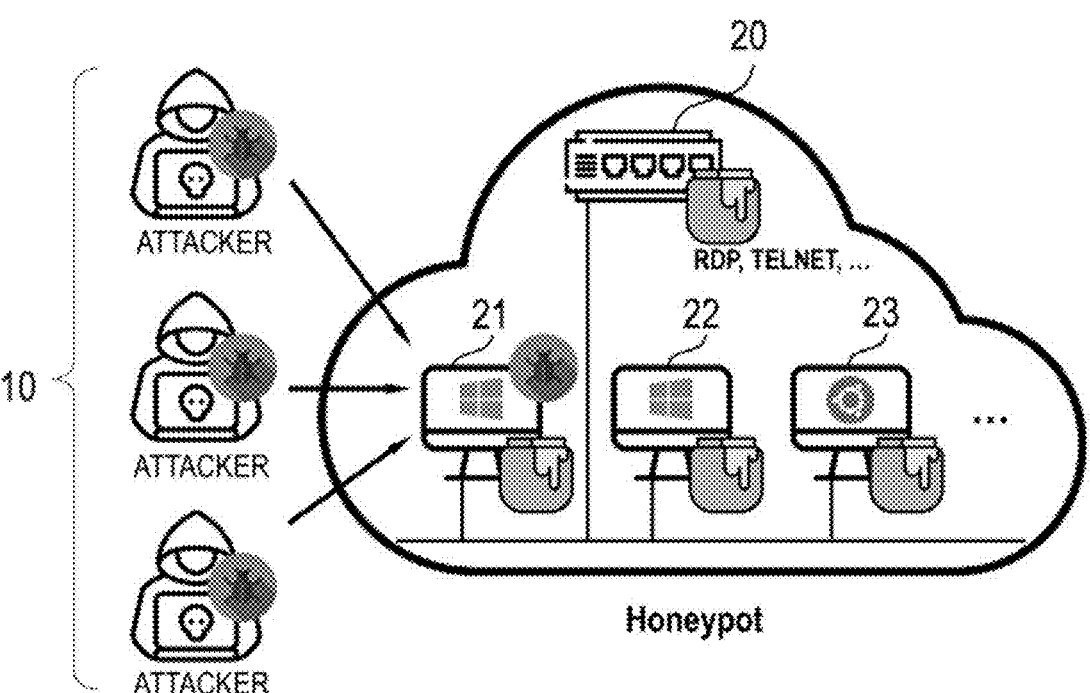
FIG. 1 is a schematic diagram for describing a control method of an electronic apparatus according to an embodiment.

FIG. 1 is a schematic diagram for describing a control method of an electronic apparatus according to an embodiment.

Referring to FIG. 1, according to the embodiment, an electronic apparatus 20 may be implemented as a primary server, and may obtain attack data received from attackers 10 and information on attack execution methods, using a plurality of cloud servers 21, 22, and 23 on each of which a honeypot system is implemented. In this case, the electronic apparatus 20 may be communicatively connected to the plurality of cloud servers 21, 22, and 23.

According to one embodiment, the electronic apparatus 20 may transmit data for implementing the honeypot system corresponding to each of the plurality of cloud servers 21, 22, and 23 to each of the plurality of cloud servers 21, 22, and 23, and different types of honeypot systems corresponding to each of the plurality of cloud servers may be implemented based on the data. In this case, different Internet Protocol (IP) bands corresponding to each of the plurality of cloud servers may be assigned.

According to one embodiment, when an attacker attacks at least one of the plurality of cloud servers 21, 22, and 23 on each of which a honeypot system is implemented, the attacked cloud server obtains log data for identifying attack data and information on an attack execution method and transmits the obtained log data to the electronic apparatus 20. When receiving the log data, the electronic apparatus 20 may obtain malicious code information using the received log data.

Hereinafter, various embodiments in which malicious code may be collected using a plurality of cloud servers on which different types of honeypot systems are implemented, log information in various IP bands may be obtained by setting different regions on each of the plurality of cloud servers, and various malicious code may be collected based on the obtained log information will be described. Further, various embodiments in which various types of log information may be collected by building different types of honeypot systems corresponding to each of a plurality of cloud servers will be described.

Figure 2:
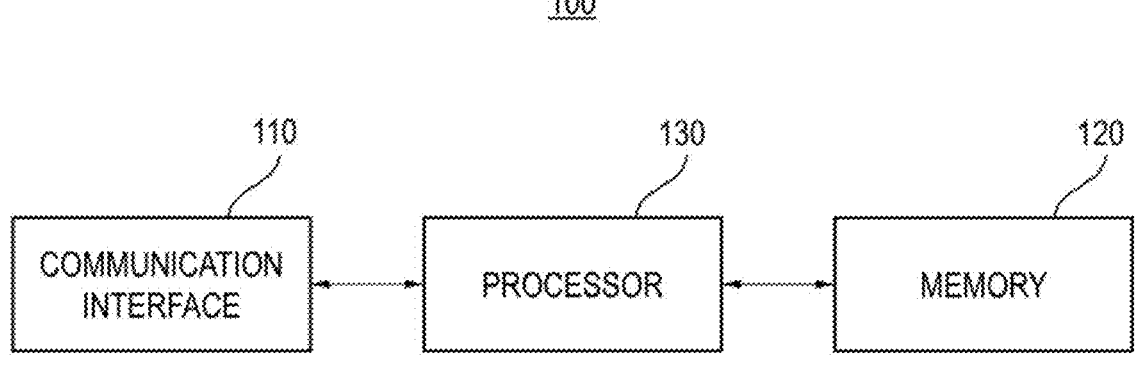
FIG. 2 is a block diagram illustrating a configuration of an electronic apparatus according to an embodiment.

FIG. 2 is a block diagram illustrating a configuration of an electronic apparatus according to an embodiment.

Referring to FIG. 2, an electronic apparatus 100 may include a communication interface 110, a memory 120, and one or more processors 130.

According to an embodiment, the electronic apparatus 100 may be implemented as a primary server, but the present disclosure is not limited thereto, and the electronic apparatus 100 may be implemented as one of various types of devices that can communicate with a plurality of cloud servers. The electronic apparatus 100 may be communicatively connected to the plurality of cloud servers in various ways. According to an embodiment, communication modules for communication with the plurality of cloud servers may be implemented identically.

Meanwhile, the electronic apparatus 100 may be communicatively connected to the plurality of cloud servers. Each of the plurality of cloud servers may be communicatively connected to the electronic apparatus 100, the plurality of cloud servers may be implemented as a single cluster by being communicatively connected to each other, and different regions may be assigned to each of the plurality of cloud servers. Meanwhile, according to one example, the electronic apparatus 100 and the plurality of cloud servers may be communicatively connected through a network. That is, the electronic apparatus 100 and the plurality of cloud servers may be communicatively connected by transmitting or receiving data to or from each other through a separate external server.

Meanwhile, according to an embodiment, different IP bands corresponding to each of the plurality of cloud servers may be present. According to one embodiment, different regions may be assigned to each of the plurality of cloud servers, and IP bands corresponding to the regions assigned to each of the plurality of cloud servers may be present. Here, the region is a physical location (or geographical location) where data centers are clustered, and according to one example, the region may correspond to a country, but the present disclosure is not limited thereto.

For example, a first region corresponding to Seoul among a plurality of regions may be assigned to a first cloud server among a plurality of cloud servers, and a second region corresponding to Tokyo among the plurality of regions may be assigned to a second cloud server. Accordingly, a first IP band (an IP band corresponding to the first region) corresponding to the first cloud server may be present, and a second IP band (an IP band corresponding to the second region) corresponding to the second cloud server may be present. In this case, since the IP bands are different for each country, the first IP band and the second IP band may be different.

According to one embodiment, the cloud servers may be implemented with Amazon Web Services (AWS), but the present disclosure is not limited thereto, and the cloud servers may be implemented as different types of cloud servers.

The communication interface 110 may input or output various types of data. For example, the communication interface 110 may transmit or receive various types of data to or from an external device (e.g., a source device), an external storage medium (e.g., a Universal Serial Bus (USB) memory), and an external server (e.g., web hard) through communication methods such as AP-based Wi-Fi (wireless local area network (LAN)), Bluetooth, Zigbee, wired/wireless LAN, wide area network (WAN), Ethernet, IEEE 1394, high-definition multimedia interface (HDMI), USB, mobile high-definition link (MHL), Audio Engineering Society/European Broadcasting Union (AES/EBU), optical, coaxial, etc.

In the memory 120, data necessary for various embodiments may be stored. The memory 120 may be implemented in the form of a memory embedded in the electronic apparatus 100 or in the form of a memory detachable from the electronic apparatus 100 depending on the data storage purpose. For example, data for driving the electronic apparatus 100 may be stored in the memory embedded in the electronic apparatus 100, and data for an expansion function of the electronic apparatus 100 may be stored in the memory that is detachable from the electronic apparatus 100.

Meanwhile, the memory embedded in the electronic apparatus 100 may be implemented as at least one of a volatile memory (e.g., a dynamic random access memory (DRAM), a static RAM (SRAM), or a synchronous dynamic RAM (SDRAM), etc.) and a non-volatile memory (e.g., a one time programmable read-only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash, a NOR flash, etc.), a hard drive, or a solid state drive (SSD)). Further, the memory that is detachable from the electronic apparatus 100 may be implemented in the form of a memory card (e.g., a compact flash (CF) card, a secure digital (SD) card, a micro (micro-SD) card, a mini (Mini-SD) card, an extreme digital (xD) card, a multimedia card (MMC), etc.), an external memory (e.g., a USB memory) that can be connected to a USB port, etc.

Meanwhile, according to an embodiment, execution information may be stored in the memory 120. Here, the execution information is information for driving a plurality of cloud servers. According to one embodiment, the execution information may include at least one of information on a virtual machine built on a cloud server, information on a running service, and information on an open port. That is, virtual machine information, service information, and port information that are mapped to each of the plurality of cloud servers may be stored in the memory 120.

Meanwhile, a virtual machine is a technology for implementing a computing environment in software. Virtual machine information is information on the type of at least one virtual machine built on each of the plurality of cloud servers. According to one embodiment, the type of virtual machine may be at least one of VMware and VirtualBox, but the present disclosure is not limited thereto. For example, when virtual machine information corresponding to the first cloud server among the plurality of cloud servers is "VMware," VMware among a plurality of virtual machines may be built on the first cloud server on the basis of the virtual machine information. However, the present disclosure is not limited thereto, and the type of virtual machine built on each of the plurality of cloud servers may be preset.

Information on a service running on a cloud server is information on at least one application to be run on a plurality of cloud servers on each of which a virtual machine is installed. According to one embodiment, when different types of services, including "elastic," "File Transfer Protocol (FTP)," and "Remote Desktop Protocol (RDP)," are present as executable services (or applications) on the first cloud server on which VMware is deployed, the first cloud server may execute at least one service, "FTP" or "RDP," identified from among different types of applications, on the basis of the service information.

Meanwhile, a port is a logical unit that identifies a network service or a specific process, and a port value corresponding to each of a plurality of services may be set. According to one embodiment, a port value corresponding to "ftp" is 21, and a port value corresponding to "http" is 80. Port information is information on an open port value among port values corresponding to services executable on the cloud server. According to one embodiment, the first cloud server may open only a port with a preset value on the basis of the port information received from the electronic apparatus 100. Meanwhile, the port value corresponding to the executable service may be a preset value, but the present disclosure is not limited thereto, and the port value corresponding to the service may be changed according to user input.

According to an embodiment, execution information corresponding to each of the plurality of cloud servers that are communicatively connected to the electronic apparatus 100 may be stored in the memory 120.

The one or more processors 130 (hereinafter referred to as "processors") are electrically connected to the communication interface 110 and the memory 120 and control an overall operation of the electronic apparatus 100. The processor 130 may be comprised of one or plurality of processors. Specifically, the processor 130 may perform the operation of the electronic apparatus 100 according to various embodiments of the present disclosure by executing at least one instruction stored in the memory 120.

According to an embodiment, the processor 130 may be implemented as a digital signal processor (DSP) that processes digital image signals, a microprocessor, a graphics processing unit (GPU), an artificial intelligence (AI) processor, a neural processing unit (NPU), or a time controller (TCON). However, the present disclosure is not limited thereto, and the processor 130 may include one or more of a central processing unit (CPU), a micro controller unit (MCU), a micro processing unit (MPU), a controller, an application processor (AP), a communication processor (CP), and an advanced reduced instruction set computer (RISC) machine (ARM) processor, or may be defined with a corresponding term. Further, the processor 130 may be implemented as system on chip (SoC) or large scale integration (LSI) with a built-in processing algorithm, or may be implemented in the form of an application specific integrated circuit (ASIC) or a field programmable gate array (FPGA).

According to an embodiment, the processor 130 may transmit the execution information obtained based on the information stored in the memory 120 to each of the plurality of cloud servers in different IP bands through the communication interface 110. According to one embodiment, different regions may be assigned to each of the plurality of cloud servers, and different IP bands corresponding to each of the plurality of cloud servers may be present.

Meanwhile, according to one example, each of the plurality of cloud servers may be implemented as at least one type of honeypot platform. According to one embodiment, the honeypot platform may be at least one of a T-pot, a Honeytrap, and an Open Worldwide Application Security Project (OWASP) honeypot, but the present disclosure is not limited thereto, and different types of honeypot platforms corresponding to each of the plurality of cloud servers may be present.

According to one embodiment, the processor 130 may obtain first virtual machine information, first service information, and first port information that correspond to the first cloud server among the plurality of cloud servers on the basis of the information stored in the memory 120, and transmit the obtained execution information to the first cloud server through the communication interface 110. Further, the processor 130 may obtain second virtual machine information, second service information, and second port information that correspond to the second cloud server among the plurality of cloud servers on the basis of the information stored in the memory 120, and transmit the obtained execution information to the second cloud server through the communication interface 110. In this case, the first cloud server and the second cloud server may be implemented as different cloud servers in different IP bands.

However, the present disclosure is not limited thereto, and according to one example, the processor 130 may identify the execution information through a user command or a preset algorithm.

Meanwhile, according to an embodiment, the processor 130 may receive log information through the communication interface 110 from each of the plurality of cloud servers that have received the execution information. Here, the log information is information in which situations occurring in the information technology (IT) infrastructure are recorded. According to one embodiment, the log information may include different types of information, including IP information of an external device, access port information, execution service information, and information on a time point of occurrence of a situation.

For example, when an attack is performed by an attacker, the log information may include the attacker's attack target port information, running service information, the attacker's IP information, and information on a time point of the attack. When an attack is performed against one of the plurality of cloud servers on each of which the honeypot system is implemented, the cloud server may obtain the log information including attack target port information of the attacker who is a subject of the attack, running service information, the attacker's IP information, and information on a time point of the attack.

Meanwhile, according to an embodiment, the processor 130 may normalize the log information received from the cloud server. According to one embodiment, when receiving the log information through the communication interface 110 from the cloud server implemented as the honeypot platform, the processor 130 may parse the log information by item, normalize the parsed log information, index the normalized log information, and store the indexed log information in the memory 120.

Here, the item included in the log information may be, for example, any one of an IP item of a subject performing communication with the cloud server, a service item running on the cloud server when a situation occurs, a situation occurrence time point item and a port item, but the present disclosure is not limited thereto. Meanwhile, a specific method of normalizing the log information received from the cloud server will be described in detail with reference to FIG. 4.

According to an embodiment, the processor 130 may obtain malicious code information using the normalized log information. According to one embodiment, the processor 130 may parse the log information by item, and identify the log information corresponding to the attacker's attack on the basis of the parsed log information. The processor 130 may obtain the malicious code information on the basis of the identified log information.

According to the above-described example, the electronic apparatus 100 may obtain the log information from the plurality of cloud servers implemented as various types of honeypot platforms, parse the obtained log information by item, and store the parsed log information in the memory 120. According to this, the honeypot platform may be easily built using virtual machine technology, the log information may be obtained through various types of honeypot platforms, and thus the probability of the honeypot being discovered by an attacker may be reduced. Further, various types of attack information may be obtained by obtaining the log information of different IP bands. In addition, by normalizing and storing the log information, data may be collected and utilized efficiently even when the log information is collected using various types of honeypot platforms.

Figure 3:
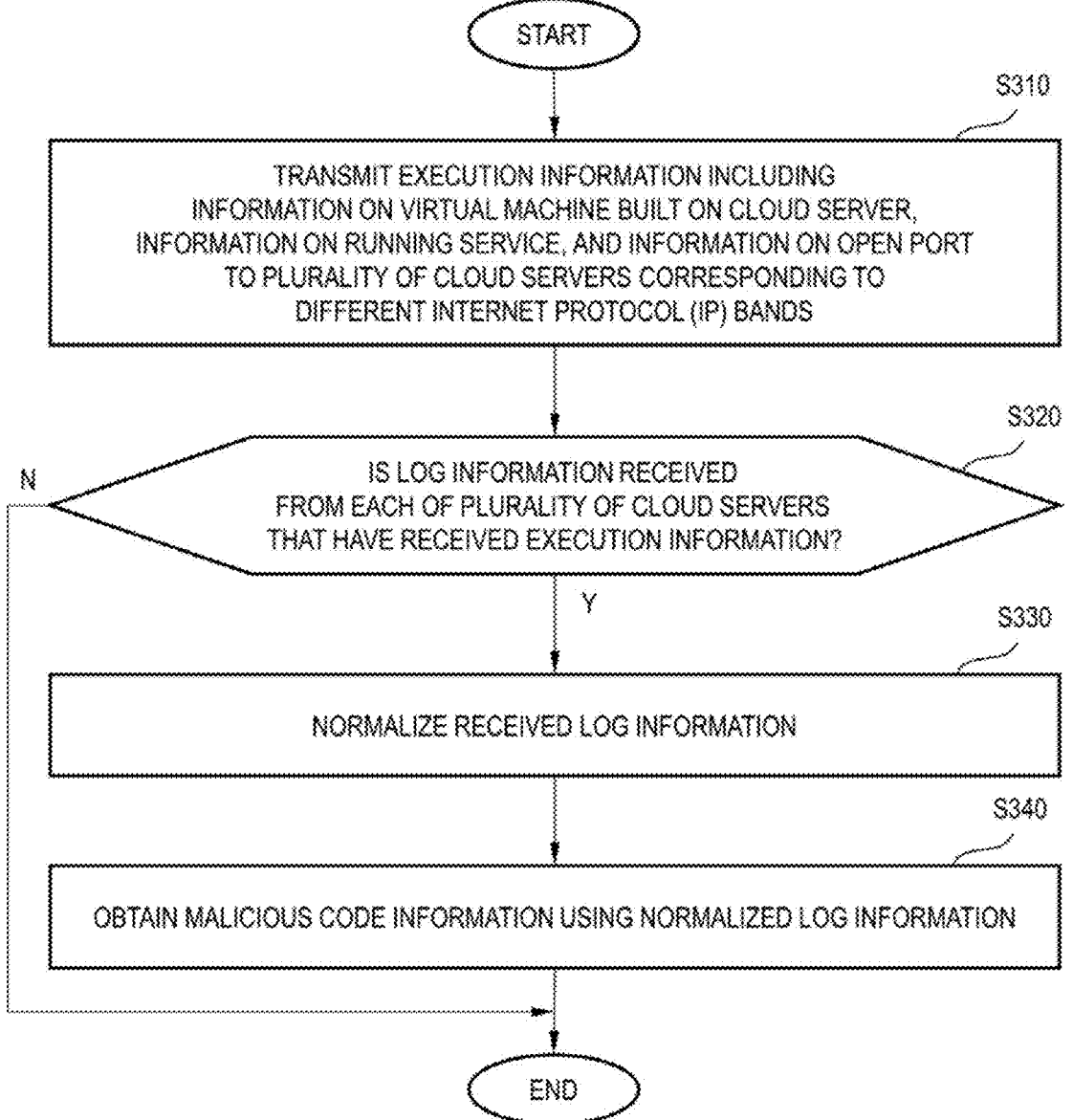
FIG. 3 is a flowchart for describing a control method of an electronic apparatus according to an embodiment.

FIG. 3 is a flowchart for describing a control method of an electronic apparatus according to an embodiment.

Referring to FIG. 3, first, an electronic apparatus 100 may transmit execution information including information on a virtual machine built on a cloud server, information on a running service, and information on an open port, to a plurality of cloud servers in different IP bands (S310).

According to one embodiment, a processor 130 may identify first execution information corresponding to a first cloud server among the plurality of cloud servers that are communicatively connected to the electronic apparatus 100, on the basis of information stored in a memory 120. For example, the processor 130 may identify that virtual machine information corresponding to the first cloud server is VMware, running service information is "elastic," "FTP," or "RDP," and open port information is a first value, on the basis of the information stored in the memory 120. Alternatively, the processor 130 may identify that virtual machine information is VirtualBox, running service information is "MySQL" or "DNS," and open port information is a second value, as second execution information corresponding to the second cloud server among the plurality of cloud servers that are communicatively connected to the electronic apparatus 100. In this case, the first value and the second value may be information including the port values corresponding to the running services, but the present disclosure is not limited thereto, and the first value and the second value may be port values obtained based on user input.

Subsequently, the electronic apparatus 100 may identify whether log information is received from each of the plurality of cloud servers that have received the execution information (S320). According to one embodiment, the processor 130 may receive first log information from the first cloud server that has received the first execution information corresponding to the first cloud server implemented as a first honeypot platform. In this case, the first log information may include IP information of an external device, access port information, execution service information, and information on a time point of occurrence of a situation. Further, the processor 130 may receive second log information from the second cloud server that has received the second execution information corresponding to the second cloud server implemented as a second honeypot platform different from the first honeypot platform. In this case, the second log information may include IP information of an external device, access port information, execution service information, and information on a time point of occurrence of a situation.

Subsequently, when the log information is received (Y in S320), the first electronic apparatus 100 may normalize the received log information (S330). According to one embodiment, when the first log information and the second log information are received through a communication interface 110, the processor 130 may parse each of the received first log information and second log information by item, normalize the parsed first log information and second log information, index the normalized first log information and second log information, and store the indexed first log information and second log information in the memory 120.

Subsequently, the electronic apparatus 100 may obtain malicious code information using the normalized log information (S340).

According to the above-described example, the electronic apparatus 100 may obtain the log information from the plurality of cloud servers implemented as various types of honeypot platforms, parse the obtained log information by item, and store the parsed log information in the memory 120. According to this, the honeypot platform may be easily built using virtual machine technology, the log information may be obtained through various types of honeypot platforms, and thus the probability of the honeypot being discovered by an attacker may be reduced. Further, various types of attack information may be obtained by obtaining the log information of different IP bands. In addition, by normalizing and storing the log information, data may be collected and utilized efficiently even when the log information is collected using various types of honeypot platforms.

Figure 4:
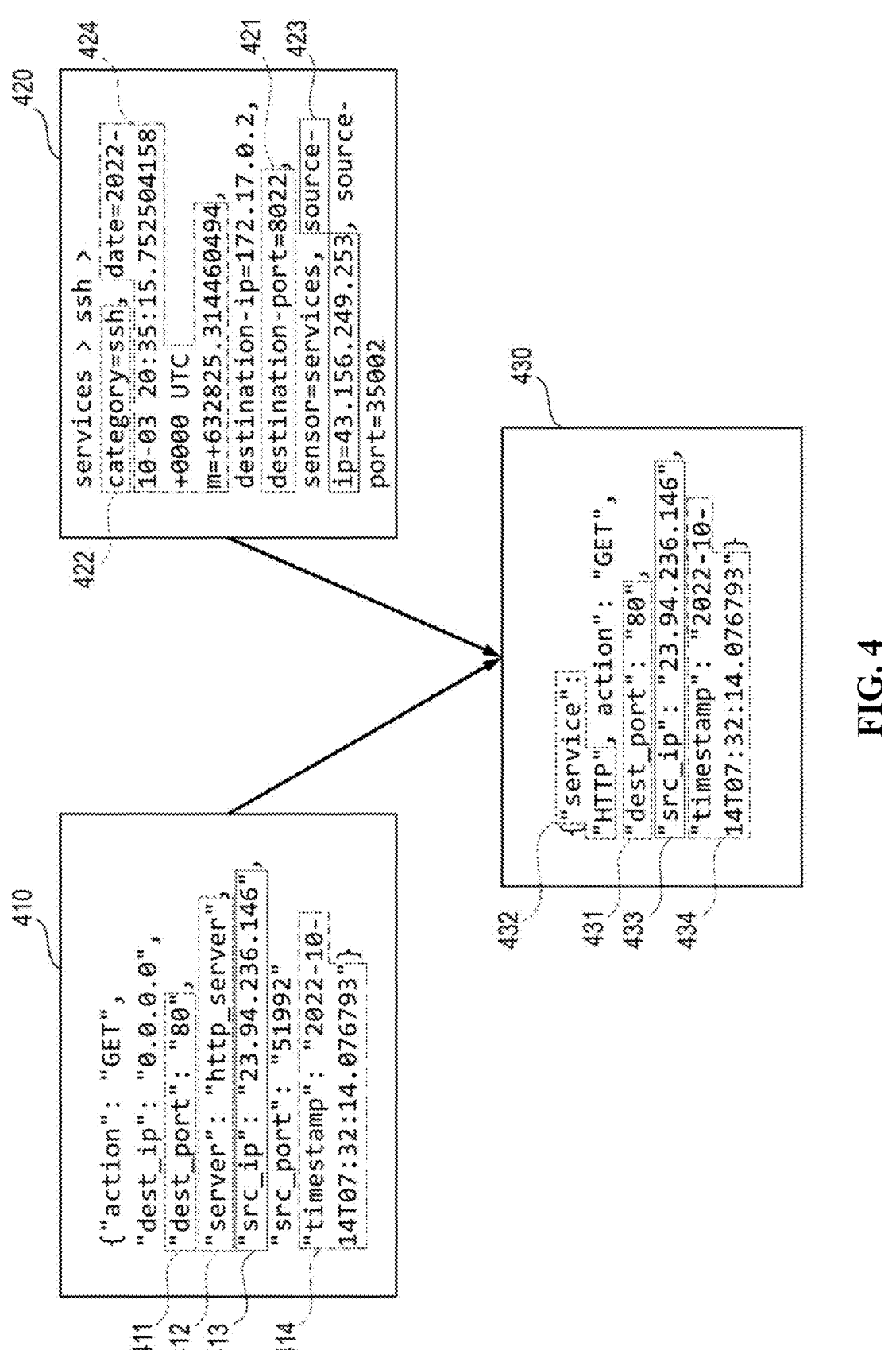
FIG. 4 is a diagram for describing a method of normalizing log information according to an embodiment.

FIG. 4 is a diagram for describing a method of normalizing log information according to an embodiment.

Referring to FIG. 4, according to an embodiment, a processor 130 may receive different types of log information from each of a plurality of cloud servers implemented as different types of honeypot platforms, and the processor 130 may normalize the received different types of log information and store the normalized log information in a memory 120. Meanwhile, the received log information may be JavaScript Object Notation (JSON) type information, but the present disclosure is not limited thereto, and the received log information may be a different type of information having its own log type in the form of a character string.

According to one example, it is assumed that first log information 410 is received from a first cloud server implemented as a first honeypot platform, and second log information 420 is received from a second cloud server implemented as a second honeypot platform. The first log information 410 may include '"dest_port": "80"' corresponding to a port item 411, '"server": "http_server"' corresponding to a service item 412, '"src_ip": "23.94.236.146"' corresponding to an IP item 413, and '"timestamp": "2022-10-14T07:32:14.076793"' corresponding to a situation occurrence time point item 414.

Further, the second log information 420 may include 'destination-port=8022' corresponding to a port item 421, 'category=ssh' corresponding to a service item 422, 'source-ip=43.156.249.253' corresponding to an IP item 423, and 'date=2022-10-03    20:38:15.752504158+0000    UTC m=+632825.314460494' corresponding to a situation occurrence time point item 424.

According to one embodiment, the processor 130 may parse the received different types of first log information and second log information as information corresponding to different types of items, including an IP item of a subject communicating with the cloud server, a service item running on the cloud server when a situation occurs, a situation occurrence time point item, and a port item. For example, the processor 130 may parse the first log information 410 received from the first cloud server implemented as the first honeypot platform, and obtain updated first log information 430. The updated first log information 430 may include "'dest_port": "80"' corresponding to a port item 431, "'service": "HTTP"' corresponding to a service item 432, "'src_ip": "23.94.236.146"' corresponding to an IP item 433, and "'timestamp": "2022-10-14T07:32:14.076793"' corresponding to a situation occurrence time point item 434.

In this case, according to one example, the processor 130 may parse the log information using a parsing algorithm corresponding to each of the received different types of log information. For example, the processor 130 may convert the log information into a dictionary using the Python JSON library, and then extract a corresponding key and value to parse the log information. Alternatively, the processor 130 may parse the log information on the basis of commas (,) and equal signs (=). For example, the processor 130 may distinguish each log part on the basis of the commas, then use a character string to the left of an equal sign as a key, and use the character string to the right of the equal sign as a value. However, the present disclosure is not limited thereto, and the processor 130 may parse the log information using a different parsing algorithm.

Meanwhile, according to an embodiment, the processor 130 may parse and normalize the received different types of log information by item, index the normalized log information, and store the indexed log information in the memory 120.

Accordingly, even when different types of log information are received from the plurality of cloud servers implemented as different types of honeypot platforms, the log information may be parsed and normalized based on preset items, indexed, and stored in the memory 120. Accordingly, it is possible to increase the possibility of information utilization, and it is possible to efficiently identify malicious code using log information obtained within various platforms.

Figure 5:
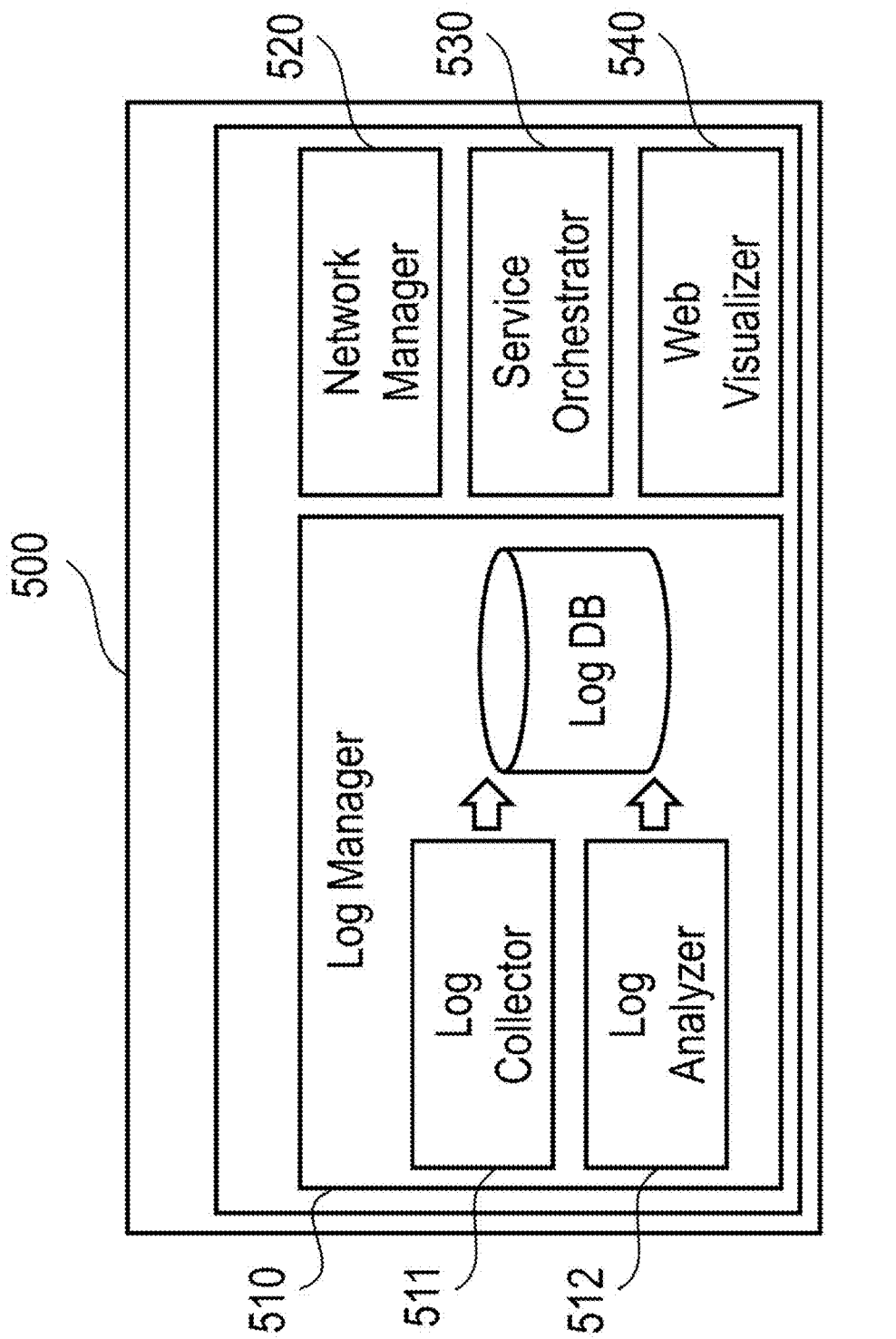
FIG. 5 is a diagram for describing an operating method of an electronic apparatus according to an embodiment.

FIG. 5 is a diagram for describing an operating method of an electronic apparatus according to an embodiment.

Referring to FIG. 5, according to an embodiment, an electronic apparatus 500 may include a log manager 510, a network manager 520, a service orchestrator 530, and a web visualizer 540.

According to one embodiment, the log manager 510 stores and analyzes log information received from a plurality of cloud servers 610 and 620. According to one embodiment, the log manager 510 may include a log collector 511 and a log analyzer 512.

The log collector 511 may store different types of log information received from the plurality of cloud servers 610 and 620 in a log database (DB). According to one example, the log DB may be included in a memory 120. The log analyzer 512 may normalize the different types of log information stored in the log DB and store the normalized log information in the log DB.

According to one embodiment, among the plurality of cloud servers 610 and 620 that are communicatively con-nected to the electronic apparatus 500, when first log information is received from the first cloud server 610 and second log information is received from a second cloud server 620, the log analyzer 512 may parse and normalize the received first log information and second log information by item, index the normalized first log information and second log information, and store the indexed first log information and second log information in the log DB of the memory 120. The item included in the log information may be, for example, any one of an IP item of a subject performing communication with the cloud server, a service item running on the cloud server when a situation occurs, a situation occurrence time point item, and a port item.

The network manager 520 identifies open port information for each of the plurality of cloud servers 610 and 620 that are communicatively connected to the electronic apparatus 500. According to one embodiment, the network manager 520 may identify information on an access control list (ACL) and open ports that correspond to each of the plurality of cloud servers 610 and 620. Here, the ACL is a permission list applied to an entity or a property of the entity. For example, the network manager 520 may identify open port information corresponding to each of services running on the plurality of cloud servers 610 and 620.

Meanwhile, the service orchestrator 530 is a module for identifying information on a virtual machine or service running on each of the plurality of cloud servers 610 and 620 that are communicatively connected to the electronic apparatus 500. According to one embodiment, the service orchestrator 530 may identify virtual machine information and service information corresponding to the first cloud server 610. For example, the service orchestrator 530 may identify that the virtual machine information corresponding to the first cloud server 610 is VMware and the running service information is "elastic," "FTP," and "RDP." In this case, the service orchestrator 530 may identify at least one of the virtual machine information and the service information that correspond to each of the plurality of cloud servers 610 and 620 on the basis of the information stored in the memory 120.

Meanwhile, the electronic apparatus 500 may include the web visualizer 540. The web visualizer 540 may visualize the log information stored in the log DB in web form, and generate and provide a corresponding user interface (UI). In this case, according to one example, a UI including statistical data for the log information stored in the log DB may be provided. For example, the web visualizer 540 may generate and provide a UI that includes the statistical data for the log information stored in the log DB and the log information stored in the memory 120.

According to an embodiment, a processor 130 may obtain statistical data for the normalized log information using a preset algorithm and provide a UI including the obtained statistical data and the normalized log information. In this case, according to one example, the processor 130 may use the web visualizer 540 to provide a UI including the obtained statistical data and the normalized log information. In this case, statistical data may be provided through the Kibana dashboard.

According to the above, the electronic apparatus 500 may use a plurality of different types of modules included in the electronic apparatus 500 to obtain UI information of the log information together with execution information including virtual machine information, open port information, and running service information that correspond to each of the plurality of cloud servers 610 and 620. That is, the electronic apparatus 500 may obtain the execution information on the basis of the information stored in the memory 120, or may obtain the execution information and the UI information using the plurality of modules included in the electronic apparatus 500.

Figure 6:
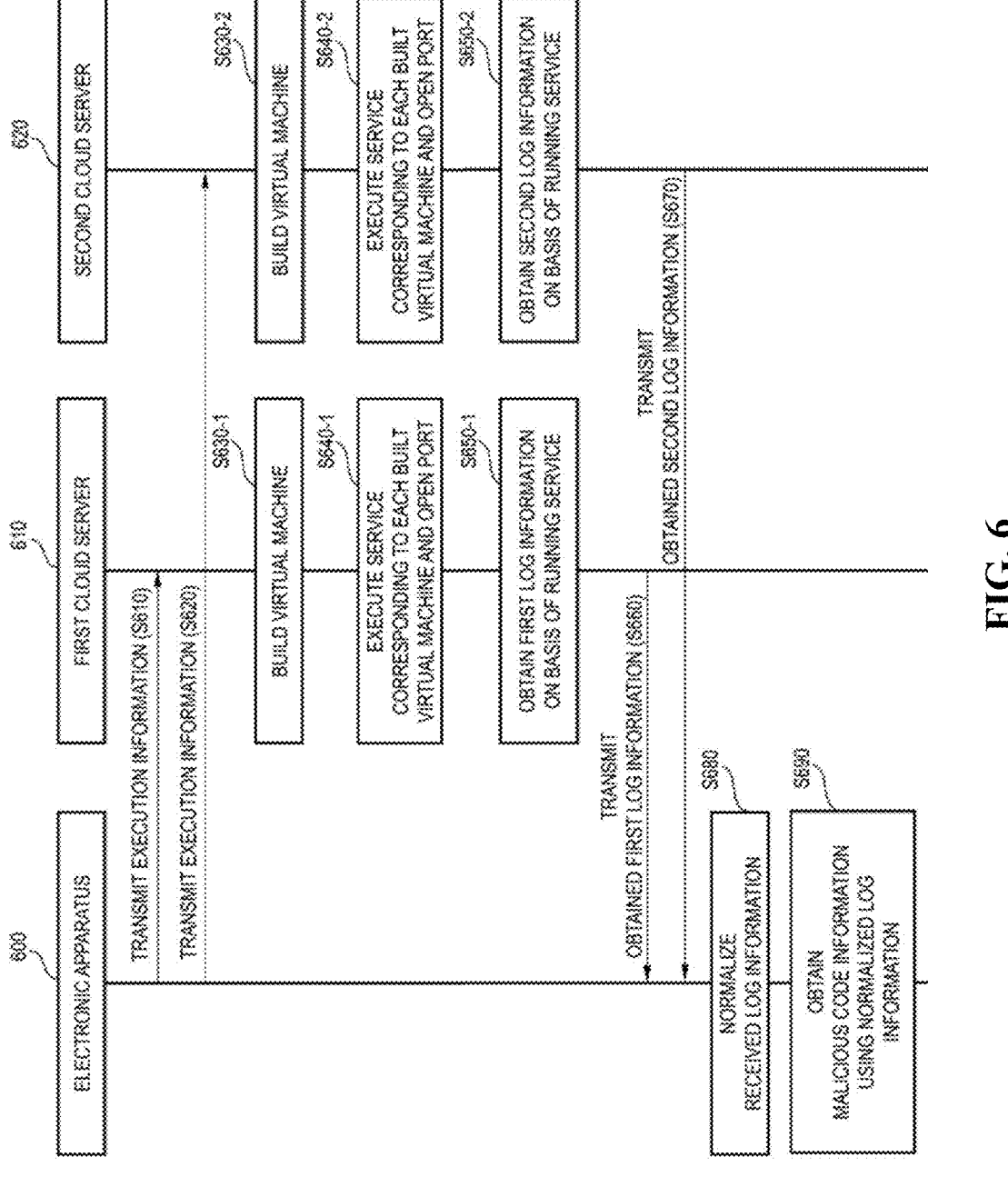
FIG. 6 is a diagram for describing a communication system including an electronic apparatus and a plurality of cloud servers according to an embodiment.

FIG. 6 is a diagram for describing a communication system including an electronic apparatus and a plurality of cloud servers according to an embodiment.

Referring to FIG. 6, first, according to an embodiment, an electronic apparatus 600 may transmit execution information to a first cloud server 610 (S610) and transmit the execution information to a second cloud server 620 (S620). According to one embodiment, the electronic apparatus 600 may be communicatively connected to a plurality of cloud servers including the first cloud server 610 and the second cloud server 620. However, in FIG. 6, for convenience of description, description will be limited to the first cloud server 610 and the second cloud server 620.

According to one embodiment, the electronic apparatus 600 identifies first execution information corresponding to the first cloud server 610 and second execution information corresponding to the second cloud server 620. Next, the electronic apparatus 600 may transmit the first execution information to the first cloud server 610 and transmit the second execution information to the second cloud server 620 through a communication interface 110. Here, the execution information including the first execution information and the second execution information may include virtual machine information, open port information, and running service information that correspond to each cloud server.

Subsequently, the first cloud server 610 may build one or more virtual machines on the basis of the execution information received from the electronic apparatus 600 (S630-1), and execute a service corresponding to each built virtual machine and open a port (S640-1). According to one embodiment, the first cloud server 610 may build 'VMware' and 'VirtualBox' on the basis of the information received from the electronic apparatus 600, execute an 'elastic,' 'FTP,' and 'RDP' service in a 'VMware' environment, and execute a 'MySQL' service in 'VirtualBox.' Further, the first cloud server 610 may open a port corresponding to each running service on the basis of the information received from the electronic apparatus 600. In this case, a default port corresponding to each running service may be opened, but the present disclosure is not limited thereto, and the port value corresponding to each running service may be changed according to user input.

Subsequently, the first cloud server 610 may obtain first log information on the basis of the service running on each of the one or more built virtual machines (S650-1). According to one example, the first cloud server 610 may obtain JSON type log information on the basis of the running service.

Meanwhile, the second cloud server 620 may build one or more virtual machines on the basis of the execution information received from the electronic apparatus 600 (S630-2), and execute a service corresponding to each built virtual machine and open a port (S640-2). According to one embodiment, the second cloud server 620 may build a virtual machine 'VirtualBox' on the basis of the information received from the electronic apparatus 600, and execute a 'MySQL' and 'telnet' service in 'VirtualBox.' Further, the second cloud server 620 may open a port corresponding to each running service on the basis of the information received from the electronic apparatus 600. In this case, a default port corresponding to each running service may be opened, but the present disclosure is not limited thereto, and the port value corresponding to each running service may be changed according to user input.

Subsequently, the second cloud server 620 may obtain second log information on the basis of the service running on each of the one or more built virtual machines (S650-2). According to one example, the second cloud server 620 may obtain log information having a log type in the form of a character string on the basis of the running service.

Subsequently, the first cloud server 610 may transmit the obtained first log information to the electronic apparatus 600 (S660), and the second cloud server 620 may transmit the obtained second log information to the electronic apparatus 600 (S670).

Subsequently, the electronic apparatus 600 may normalize the received log information (S680). According to one embodiment, when the JSON type log information is received from the first cloud server 610 and the log information having a log type in the form of a character string is received from the second cloud server 620 through the communication interface 110, the electronic apparatus 600 may parse the received log information by item and store the parsed log information in the memory 120. For example, the electronic apparatus 600 may parse the first log information and the second log information as information corresponding to different types of items, including an IP item of a subject communicating with the cloud server, a service item running on the cloud server when a situation occurs, a situation occurrence time point item, and a port item.

Subsequently, according to an embodiment, the electronic apparatus 600 may obtain malicious code information using the normalized log information (S690).

FIG. 7 is a block diagram illustrating a detailed configuration of an electronic apparatus according to an embodiment.

Referring to FIG. 7, an electronic apparatus 100' may include a communication interface 110, a memory 120, one or more processors 130, a microphone 140, a speaker 150, a display 160, a UI 170, and at least one sensor 180. Detailed descriptions of components that overlap with the components illustrated in FIG. 2, among the components illustrated in FIG. 7, will be omitted.

The microphone 140 may be a module for obtaining sound and converting the sound into an electrical signal, and may include a condenser microphone, a ribbon microphone, a moving coil microphone, a piezoelectric element microphone, a carbon microphone, or a micro electro mechanical system (MEMS) microphone. Further, the microphone 140 may be implemented in an omni-directional, bi-directional, unidirectional, sub-cardioid, super-cardioid, or hyper-cardioid way.

There may be various examples in which the electronic apparatus 100' performs an operation corresponding to a user's voice signal received through the microphone 140.

As an example, the electronic apparatus 100' may control the display 160 on the basis of the user's voice signal received through the microphone 140. For example, when a user's voice signal for displaying content A is received, the electronic apparatus 100' may control the display 160 to display content A.

As another example, the electronic apparatus 100' may control an external display device connected to the electronic apparatus 100' on the basis of the user's voice signal received through the microphone 140. Specifically, the electronic apparatus 100' may provide a control signal for controlling the external display device so that the operation corresponding to the user's voice signal is performed on the external display device, and transmit the provided control signal to the external display device. Here, the electronic apparatus 100' may store a remote control application for controlling the external display device. In addition, the electronic apparatus 100' may transmit the provided control signal to the external display device using at least one communication method among Bluetooth, Wi-Fi, or infrared communication methods. For example, when the user's voice signal for displaying content A is received, the electronic apparatus 100' may transmit the control signal for controlling content A to be displayed on the external display device to the external display device. Here, the electronic apparatus 100' may be one of various terminal devices on which a remote control application can be installed, such as a smartphone, an AI speaker, and the like.

As still another example, the electronic apparatus 100' may use a remote control device in order to control the external display device connected to the electronic apparatus 100' on the basis of the user's voice signal received through the microphone 140. Specifically, the electronic apparatus 100' may transmit a control signal for controlling the external display device to the remote control device so that an operation corresponding to the user's voice signal is performed on the external display device. In addition, the remote control device may transmit the control signal received from the electronic apparatus 100' to the external display device. For example, when the user's voice signal for displaying content A is received, the electronic apparatus 100' may transmit the control signal for controlling content A to be displayed on the external display device to the remote control device, and the remote control device may transmit the received control signal to the external display device.

The speaker 150 may include a tweeter for reproduction of high-pitched sounds, a midrange for reproduction of mid-pitched sounds, a woofer for reproduction of low-pitched sounds, a subwoofer for reproduction of extremely low-pitched sounds, an enclosure for controlling resonance, a crossover network that divides an electrical signal frequency input to a speaker into bands, and the like.

The speaker 150 may output an acoustic signal to the output of the electronic apparatus 100'. The speaker 150 may play multimedia, play recordings, and output various notification sounds, voice messages, etc. The electronic apparatus 100' may include an audio output device such as the speaker 150, or may include an output device such as an audio output terminal. In particular, the speaker 150 may provide obtained information, information processed and produced based on the obtained information, response results to the user's voice, operation results, etc. in voice form.

The display 160 may be implemented as a display including a self-emitting element or a display including a non-emitting element and a backlight. For example, the display 160 may be implemented as one of various types of displays, such as a liquid-crystal display (LCD), an organic light-emitting diode (OLED) display, an LED, a micro LED, a mini LED, a plasma display panels (PDP), a quantum dot (QD) display, a quantum dot light-emitting diode (QLED), etc. The display 160 may include a driving circuit and a backlight unit that may be implemented in the form of an a-Si thin-film transistor (TFT), a low temperature poly silicon (LTPS) TFT, or an organic TFT (OTFT). Meanwhile, the display 160 may be implemented as a touch screen combined with a touch sensor, a flexible display, a rollable display, a three-dimensional (3D) display, a display in which a plurality of display modules are physically connected, etc.

The processor 130 may control the display 160 to output output images obtained according to the various examples described above. Here, the output images may be high-resolution images of 4K or 8K or higher.

Meanwhile, according to another embodiment, the electronic apparatus 100' may not include the display 160. The electronic apparatus 100' may be connected to an external display device, and may transmit an image or content stored in the electronic apparatus 100' to the external display device. Specifically, the electronic apparatus 100' may transmit the image or content to the external display device together with a control signal for controlling the image or content to be displayed on the external display device.

Here, the external display device may be connected to the electronic apparatus 100' through the communication interface 110 or an input/output interface (not illustrated). For example, the electronic apparatus 100' may not include a display such as a set top box (STB). Further, the electronic apparatus 100' may include only a small display capable of displaying only simple information such as text information. Here, the electronic apparatus 100' may transmit the image or content to the external display device through the communication interface 110 in a wired or wireless manner, or may transmit the image or content to the external display device through the input/output interface (not illustrated).

The UI 170 is a component for allowing the electronic apparatus 100' to interact with a user. For example, the UI 170 may include at least one of a touch sensor, a motion sensor, a button, a jog dial, a switch, a microphone, and a speaker, but the present disclosure is not limited thereto.

At least one sensor 180 (hereinafter referred to as a "sensor") may include a plurality of sensors of various types. The sensor 180 may measure a physical quantity or detect an operating state of the electronic apparatus 100', and convert the measured or detected information into an electrical signal. The sensor 180 may include a camera, and the camera may include a lens that focuses visible light and other optical signals reflected by an object and received onto an image sensor, and the image sensor that can detect visible light and other optical signals. Here, the image sensor may include a two-dimensional (2D) pixel array divided into a plurality of pixels.

According to the above-described example, usability may be increased by building a honeypot using virtual machine technology. Further, by implementing the cloud servers to which various regions are assigned (or various IP bands are assigned), various IP bands may be configured, and accordingly, log information of various IP bands may be collected. In addition, a separate log collection server is used, and thus the log information may be easily collected from a plurality of servers and stored. Further, various types of honeypot systems may be built using different types of honeypot frameworks.

Meanwhile, the methods according to various embodiments of the present disclosure described above may be implemented in the form of applications that can be installed on existing electronic apparatuses. Alternatively, the methods according to various embodiments of the present disclosure described above may be performed using a deep learning-based learned neural network (or deep learned neural network), that is, a learning network model. Further, the methods according to various embodiments of the present disclosure described above may be implemented only by upgrading software or hardware for existing electronic apparatuses. Further, the various embodiments of the present disclosure described above may be performed through an embedded server provided in an electronic apparatus or an external server of the electronic apparatus.

Meanwhile, according to an embodiment of the present disclosure, the various embodiments described above may be implemented in software including instructions stored in machine-readable storage media that can be read by a device (machine) (e.g., a computer). The device is a device that can call the stored instructions from a storage medium and operate according to the called instructions, and may include a display device (e.g., display device A) according to the disclosed embodiments. When instructions are executed by a processor, the processor may perform a function corresponding to the instructions directly or using other components under the control of the processor. The instructions may include code provided or executed by a compiler or interpreter. The storage medium that can be read by the device may be provided in the form of a non-transitory storage medium. Here, the term "non-transitory" only means that the storage medium does not contain signals and is tangible, and does not distinguish whether data is stored in the storage medium semi-permanently or temporarily.

Further, according to an embodiment, the methods according to the various embodiments described above may be included in computer program products and provided. The computer program products are commodities and may be traded between sellers and buyers. The computer program products may be distributed in the form of a machine-readable storage medium (e.g., compact disc ROM (CD-ROM)) or online through an application store (e.g., Play Store™). In the case of online distribution, at least some computer program products may be at least temporarily stored or provided temporarily in a storage medium such as a memory of a manufacturer's server, an application store's server, or a relay server.

Further, each component (e.g., module or program) according to the various embodiments described above may be composed of one or a plurality of entities, and some of the sub-components described above may be omitted, or other sub-components may be further included in the various embodiments. Alternatively or additionally, some components (e.g., modules or programs) may be integrated into a single entity and perform the same or similar function performed by each corresponding component prior to the integration. According to the various embodiments, operations performed by modules, programs, or other components may be performed sequentially, in parallel, iteratively, or heuristically, or at least some operations may be performed in a different order or omitted, or other operations may be added thereto.

According to the embodiments of the present disclosure, usability can be increased by building a honeypot using virtual machine technology. Further, by implementing cloud servers to which various regions are assigned, various IP bands can be configured, and accordingly, log information of various IP bands can be collected. In addition, a separate log collection server is used, and thus the log information can be easily collected from a plurality of servers and stored. Further, various types of honeypot systems can be built using different types of honeypot frameworks.

Effects of the present disclosure are not limited to the above-described effects and other effects that are not described may be clearly understood by those skilled in the art from this specification and the accompanying drawings.

While exemplary embodiments of the present disclosure have been illustrated and described above, the present disclosure is not limited to the above-described specific exemplary embodiments. Those skilled in the art may variously modify the present disclosure without departing from the gist of the present disclosure claimed by the appended claims and the modifications should not be understood individually from the technical idea or perspective of the present disclosure.

What is claimed is:

1. An electronic apparatus for implementing a honeypot control system, the electronic apparatus comprising:
   a communication interface;
   a memory configured to store execution information including information on a virtual machine built on a cloud server, information on a running service, and information on an open port; and
   a processor configured to functionally control the communication interface and the memory,
   wherein the processor is configured to:
   transmit execution information obtained based on information stored in the memory to each of a plurality of cloud servers in different Internet Protocol (IP) bands through the communication interface,
   when log information is received from each of the plurality of cloud servers that have received the execution information through the communication interface, normalize the received log information, and
   obtain malicious code information using the normalized log information,
   wherein the plurality of cloud servers are implemented as different types of honeypot platforms, and
   wherein the processor is further configured to:
   when log information of different log types is received from each of the plurality of cloud servers implemented as different types of honeypot platforms, parse and normalize the received log information of different log types by item, and
   index the normalized log information of different log types and store the indexed log information in the memory.

2. The electronic apparatus of claim 1, wherein the processor is further configured to identify statistical data by item on the basis of the log information stored in the memory, and
   provide a user interface (UI) including the identified statistical data.

3. The electronic apparatus of claim 1, wherein, in the plurality of cloud servers, a plurality of servers are communicatively connected to each other to be implemented as a single cluster and different regions are assigned to each of the plurality of servers.

4. A honeypot system including a plurality of cloud servers and an electronic apparatus,
   wherein the electronic apparatus is configured to transmit execution information including information on a virtual machine built on a cloud server, information on a running service, and information on an open port to each of the plurality of cloud servers, when log information is received from each of the plurality of cloud servers that have received the execution information, normalize the received log information, and obtain malicious code information using the normalized log information, and
   wherein the plurality of cloud servers are configured to build one or more virtual machines on the basis of the execution information received from the electronic apparatus, execute at least one service corresponding to each of the one or more built virtual machines, and transmit the log information obtained through the running service to the electronic apparatus, wherein the plurality of cloud servers are implemented as cloud servers in different IP bands, wherein the plurality of cloud servers are implemented as different types of honeypot platforms, and wherein the electronic apparatus is further configured to:

when log information of different log types is received from each of the plurality of cloud servers implemented as different types of honeypot platforms, parse and normalize the received log information of different log types by item, and index the normalized log information of different log types and store the indexed log information in a memory.

5. A control method of an electronic apparatus for implementing a honeypot control system, the control method comprising:

transmitting execution information including information on a virtual machine built on a cloud server, information on a running service, and information on an open port to each of a plurality of cloud servers in different Internet Protocol (IP) bands;

when log information is received from each of the plurality of cloud servers that have received the execution information, normalizing the received log information; and obtaining malicious code information using the normalized log information, wherein the plurality of cloud servers are implemented as different types of honeypot platforms, wherein the normalizing of the received log information includes, when log information of different log types is received from each of the plurality of cloud servers implemented as different types of honeypot platforms, parsing and normalizing the received log information of different log types by item, and wherein the control method further includes indexing the normalized log information of different log types and storing the indexed log information in a memory.

6. The control method of claim 5, further comprising:

identifying statistical data by item on the basis of the log information stored in the memory; and providing a user interface (UI) including the identified statistical data.

7. The control method of claim 5, wherein, in the plurality of cloud servers, a plurality of servers are communicatively connected to each other to be implemented as a single cluster and different regions are assigned to each of the plurality of servers.

8. A non-transitory computer-readable recording medium for storing a computer program executed by a processor of an electronic apparatus for implementing a honeypot control system to perform a control method including:

transmitting execution information including information on a virtual machine built on a cloud server, information on a running service, and information on an open port to each of a plurality of cloud servers in different Internet Protocol (IP) bands;

when log information is received from each of the plurality of cloud servers that have received the execution information, normalizing the received log information; and obtaining malicious code information using the normalized log information, wherein the plurality of cloud servers are implemented as different types of honeypot platforms, wherein the normalizing of the received log information includes, when log information of different log types is received from each of the plurality of cloud servers implemented as the different types of honeypot platforms, parsing and normalizing the received log information of different log types by item, and wherein the control method further includes indexing the normalized log information of different log types and storing the indexed log information in a memory.

*   *   *   *   *